2,736,667
DEODORIZING PETROLEUM WAXES

Arthur C. Pabst, Douglaston, and Charles F. Duchacek, Long Island City, N. Y., assignors to Socony Mobil Oil Company, Inc., a corporation of New York No Drawing. Application June 9, 1950,
Serial No. 167,252

7 Claims. (Cl. 106—270)

This invention relates to a method of treating petroleum fractions for the improvement of odor. More particularly, the present invention relates to the removal of the disagreeable rancid odor resulting when petroleum waxes and certain oil fractions are in contact with air and subject to oxidation.

As is well known in the art, petroleum waxes—and particularly paraffin waxes—oxidize readily. Oxidation takes place at elevated temperatures; for example, oxidation occurs when the wax is kept in a molten condition in open tanks. Also, when paraffin waxes are dried by air-blowing at temperatures of the order of 170° F. to 210° F., an offensive rancid odor generally develops. However, even at relatively low temperatures, as at 65–80° F., solid paraffin waxes can develop a rancid odor in prolonged storage.

Inasmuch as petroleum waxes are used in the compounding of pharmaceutical specialties, such as ointments, it is necessary that they be free of disagreeable odors. Still other uses for paraffin waxes requiring substantially odor-free materials include: food coatings, paper and cardboard food containers, milk containers, grease-proof paper, frozen-food wraps, fruit-wrap papers and the like. It is apparent, then, that if paraffin waxes are to be suitable for such uses, it is necessary to shield them from oxygen or it is necessary to make them resistant to oxidation. Obviously, it is difficult—if not economically impractical—to shield paraffin waxes from the atmosphere when using or storing the same.

Methods hitherto proposed for making paraffin waxes resistant to oxidation have generally proven inefficient or excessively expensive. For example, two such methods which have not been entirely successful are: one, treatment with steam to drive off volatile organic acids, and, two, filtration through clay to remove acids by adsorption.

It has now been discovered that the disagreeable odor normally characterizing petroleum waxes exposed to oxidation, can be removed or counteracted by treating the wax with a relatively small amount of an aldehyde polymer such as paraformaldehyde and trioxane.

Paraformaldehyde is a polymer of formaldehyde, formed by evaporating an aqueous solution of formaldehyde. It is a white solid, melting indefinitely between 120° C. and 130° C. It dissolves readily in water and when heated decomposes to regenerate formaldehyde. Trioxane is a crystalline trimer of formaldehyde, and is characterized by a melting point of 62° C. and a boiling point of 115° C. As with paraformaldehyde, trioxane decomposes to formaldehyde when heated. By way of illustration, it is possible to prepare trioxane by distilling a sixty per cent formaldehyde solution containing two per cent of sulfuric acid.

In contrast to the excellent results obtained with paraformaldehyde and trioxane, each of which is a polymer of formaldehyde, a polymer of acetaldehyde—paraldehyde—has been found to be ineffective when used in small proportion. Much larger quantities of paraldehyde provide improvement, however, but such quantities are not economically feasible.

Any convenient method for contacting or admixing paraformaldehyde or trioxane with a petroleum wax can be employed herein. The quantity of said aldehyde polymers used in effecting a substantial removal of rancid odor will, of necessity, depend upon the strength and persistency of the odor. The method of this invention contemplates the use of those quantities of the aldehyde polymers which will effect a substantial improvement in odor. In general, satisfactory results are obtained with a quantity of the aldehyde polymer from about 0.005 to about one per cent, by weight of the wax. The foregoing quantities can be exceeded, however, for any excess can be readily removed by subsequent heating and steaming of the wax. The aldehyde polymer, under such conditions, is converted to volatile formaldehyde and the latter is removed by evaporation.

A typical method for deodorizing a petroleum wax involves heating the wax until it is molten and then introducing therein the aldehyde polymer. For example, a paraffin wax—melting point 133° F.—is heated to about 250° F. and agitated. The aldehyde polymer is added to the wax and intimately admixed therewith, or it can be introduced in a stream of steam. It will be recognized that when trioxane is used, the temperature of the heated or molten wax should exceed the decomposition temperature of trioxane, namely, 62° C. or 143° F. Similarly, when paraformaldehyde is the treating agent, the temperature should be maintained above about 120° C. or 248° F. In this way, the polymer is converted to the monomer, and any excess is volatilized and removed.

Excess aldehyde polymer is removed from the treated wax by blowing steam therethrough at a temperature below about 280° F., and generally at about 250° F. It is advisable that steam blowing be stopped when the removal of excess treating agent is complete. The excess treating agent can also be removed by blowing the treated wax with nitrogen, or carbon dioxide.

The method contemplated herein is illustrated by the following typical test data. Various percentages of paraformaldehyde and trioxane were added to molten paraffin wax (133° F. melting point) and the resulting mixtures were agitated. After all of the aldehyde polymer had been added, generally a period of about 30 minutes, the molten wax was blown with steam at 250° F. for about ten minutes. The treated wax samples were then cooled to room temperature, about 70° F.

A small quantity of a wax sample was then shaved into a clean, odorless container. The container was sealed and allowed to so stand for at least one hour before it was reopened and the wax sample smelled. One sample was prepared as indicated for each observer because repeated opening of the container allows the odor to be dispersed. The odor of the wax is rated in the following manner:

1. No odor.
1.5 Very slight odor.
2. Mild odor.
3. Moderate odor.
4. Strong odor.

An arithmetical average of ratings of the observers is taken as the final result. The results are set forth in Table I.

Table I

| Sample No. | Treating Agent | Weight percent | Odor Rating After Test |
|---|---|---|---|
| 1 | None | | 4.0—Rancid odor. |
| 2 | Paraformaldehyde | 0.001 | 2.0—Musty odor. |
| 3 | ____do____ | 0.01 | 1.5—Free of formaldehyde odor. |
| 4 | ____do____ | 0.1 | 2.5—Strong odor of formaldehyde. |
| 5 | ____do____ | 1.0 | 2.5—Strong odor of formaldehyde. |
| 6 | Trioxane | 0.01 | 1.5—Free of formaldehyde odor. |
| 7 | Paraldehyde | 0.01 | 4.0—Rancid odor. |

It is seen from the results in Table I that paraformaldehyde and trioxane are effective in removing the rancid odor from the untreated paraffin wax. The samples having a strong odor of formaldehyde, namely, samples 4 and 5, can be made odor-free by extending the steaming period. Ineffective, however, is paraldehyde.

In addition to improving the odor of paraffin wax, paraformaldehyde and trioxane also improve the light stability of such hydrocarbons. As is well known to those skilled in the art, paraffin waxes are prone to color changes when exposed to light. The improvement realized herein is demonstrated by comparative test data shown below in Table II. This data was obtained by steaming a molten paraffin wax (133° F. melting point) at 250° F. for a period of about 10 minutes, with or without a small amount of treating agent present. The steamed wax was then cooled and exposed to sunlight (southern exposure) for a period of five months.

Two color standards are used in reporting results inasmuch as neither standard can be used to report the initial and final color values.

*Table II*

| Sample No. | Treating Agent | Weight Percent | Initial Color Saybolt | Final Color Lovibond | Odor Rating |
|---|---|---|---|---|---|
| 8 | None | | +30+ | 0.9 | 3 |
| 9 | Paraformaldehyde | 0.01 | +30+ | 0.6 | 1 |
| 10 | Trioxane | 0.01 | +30+ | 0.5 | 1 |
| 11 | Paraldehyde | 0.01 | +30+ | 0.8 | 2 |

It will be noted, from the results in Table II, that considerable improvement in color stability, together with odor improvement, is provided by small amounts of paraformaldehyde and trioxane. Little, if any, improvement is imparted by paraldehyde.

While the invention has been illustrated above by petroleum waxes, and particularly paraffin waxes, it is to be understood that certain other refined petroleum products susceptible to odor formation can also be improved by the method contemplated herein. Petroleum oils responding to the present method are those characterized by a boiling point in excess of about 400° F., and particularly paraffinic oils having a boiling point in excess of about 500° F. Illustrative of such oils is a solvent-refined paraffinic (or Pennsylvania type) oil having the following properties:

| | |
|---|---|
| Gravity, °API | 32.1 |
| Viscosity, SUS @ 100° F. | 100–105 |
| V. I., minimum | 100 |
| Pour point, °F. | 25 |
| Fire, minimum, °F. | 415 |
| Flash, minimum, °F. | 365 |
| Initial boiling point, °F. | 500 |
| Color, ASTM | 1 |

Samples of the foregoing oil were tested in a manner similar to that described above in connection with Table I. Various amounts of paraformaldehyde were added to the oil, and the resulting mixtures were agitated. The mixtures were then blown with steam at 250° F. for one hour, and cooled. They were stored in the dark for a period of five months. In evaluating the odor of these oils, a value of 1 was assigned to an oil having the least odor and a value of 6 to the oil having the most odor. Results of these tests are given in Table III below.

*Table III*

| Sample No. | Treating Agent | Wt. Percent | Initial Odor | Final Odor |
|---|---|---|---|---|
| 12 | None (no steaming) | | Satisfactory | 5 |
| 13 | None | | do | 4 |
| 14 | Paraformaldehyde | 0.01 | do | 3 |
| 15 | do | 0.10 | do | 1 |
| 16 | do | 0.50 | do | 2 |
| 17 | do | 1.0 | do | 6 |

Here, it will be seen that paraformaldehyde exhibits a pronounced improving action when used in amounts ranging from about 0.01 per cent to more than 0.50 per cent but less than about 1.0 per cent (by weight). Apparently, when one per cent of paraformaldehyde is used a catalytic action is manifested. It will also be noted from samples 12 and 13 that steaming of the oil without paraformaldehyde provides little, if any, improvement.

In contrast with the substantial light stabilization of paraffin wax with paraformaldehyde and trioxane (Table II, above), there is considerably less light stabilization of the aforementioned solvent-refined oil. This is shown by the test data included in Table IV, below.

*Table IV*

| Sample No. | Treating Agent | Wt. Percent | Initial Color, Saybolt | Final Color, Lovibond | Sludge Precipitation [1] |
|---|---|---|---|---|---|
| 18 | None (no steaming) | | +16 | 4.0 | 4 |
| 19 | None | | +16 | 1.6 | 1 |
| 20 | Paraformaldehyde | 0.01 | +16 | 2.5 | 2 |
| 21 | do | 0.10 | +16 | 3.4 | 3 |
| 22 | do | 0.50 | +16 | 4.1 | 5 |
| 23 | do | 1.0 | +16 | 5.0 | 6 |

[1] Sludge precipitation rating: value of 1 assigned to sample having least sludge, value of 6 indicates greatest amount of sludge.

That the method of this invention applies to hydrocarbon fractions of the character described above, and does not apply to certain other hydrocarbon fractions is revealed by test data provided in Table V below. The hydrocarbon fraction used is Stoddard solvent, predominantly paraffinic, having the following properties:

| | |
|---|---|
| Gravity, °API | 46–48 |
| Boiling range, °F. | 300–400 |
| Flash point, °F. | 104 |

Sample 25 shown in Table V was prepared by mixing a small amount of paraformaldehyde in the Stoddard solvent. Samples 26 and 27 were prepared by distilling samples 24 and 25, respectively, and using 95 per cent of the overhead product. The odor of the samples was observed, as was the odor of cloth samples which had been immersed in (or saturated with) the solvent. Color values of the samples were also obtained to determine color stability. The samples were also stored in a green house for three weeks at a temperature of about 80° F. and a relative humidity of 85%.

*Table V*

| Sample No. | Treatment | Odor Evaluation | | Fade-O-Meter | | | Storage in Greenhouse | | |
|---|---|---|---|---|---|---|---|---|---|
| | | Odor of Product | Residual Odor on Cloth | Initial Saybolt color | End of 20 hrs. | | Length of Storage, weeks | Final Saybolt Color | Odor Rating [1] |
| | | | | | Saybolt Color | Odor Rating [1] | | | |
| 24 | None | The treated is better than the blank. | The blank is better than the treated. | +30+ | +19 | 2 | 3 | +26 | 1 |
| 25 | 0.1% paraformaldehyde | do | do | +23 | +3 | 4 | 3 | +4 | 4 |
| 26 | ½ of No. 24, 95% taken as overhead. | The blank is better than the treated | do | +30 | +18 | 1 | 3 | +17 | 2 |
| 27 | ½ of No. 25 (contains approximately 0.05% paraformaldehyde), 95% taken as overhead. | do | do | +29 | +6 | 3 | 3 | +6 | 3 |

[1] In odor rating, 1 has the least odor and 4 has the most odor.

As shown by the results in Table V, the odor of the Stoddard solvent is not improved by incorporating therein 0.1 per cent of paraformaldehyde, nor is there improvement in light stability.

We claim:

1. A process for producing a substantially odorless and color stable petroleum wax, which comprises: maintaining in substantially liquid state a petroleum wax characterized by rancid odor; and introducing into said wax a small amount, from about 0.005 per cent to about one per cent, by weight, of a material consisting essentially of formaldehyde polymer selected from the group consisting of paraformaldehyde and trioxane.

2. The process as defined by claim 1 wherein the formaldehyde polymer is paraformaldehyde.

3. The process as defined by claim 1 wherein the formaldehyde polymer is trioxane.

4. A process for producing a substantially odorless and color stable petroleum wax, which comprises: maintaining in substantially liquid state a petroleum wax characterized by rancid odor and color instability; and introducing into said wax a small amount of a material consisting essentially of formaldehyde polymer selected from the group consisting of paraformaldehyde and trioxane, said amount being at least sufficient to remove the rancid odor of, and impart color stability to, said wax; and removing excess formaldehyde polymer from said wax.

5. A substantially odorless and color stable petroleum wax consisting essentially of a petroleum wax normally characterized by a rancid odor and color instability and a small amount, from about 0.005 to about one per cent by weight of said wax, of paraformaldehyde.

6. A substantially odorless and color stable petroleum wax consisting essentially of a petroleum wax normally characterized by a rancid odor and color instability and a small amount, from about 0.005 to about one per cent by weight of said wax, of trioxane.

7. A substantially odorless and color stable petroleum wax consisting essentially of a petroleum wax normally characterized by a rancid odor and color instability and a small amount, from about 0.005 to about one per cent of said wax, of a formaldehyde polymer selected from the group consisting of paraformaldehyde and trioxane.

References Cited in the file of this patent

UNITED STATES PATENTS

| | | |
|---|---|---|
| 1,680,047 | Huber, Jr. | Aug. 7, 1928 |
| 2,433,851 | Lieber | Jan. 6, 1948 |
| 2,493,360 | Pollock et al. | Jan. 3, 1950 |
| 2,496,444 | Cook | Feb. 7, 1950 |
| 2,506,632 | Carnell | July 17, 1951 |
| 2,567,174 | Arundale et al. | Sept. 11, 1951 |

FOREIGN PATENTS

| | | |
|---|---|---|
| 147,163 | Germany | Nov. 12, 1903 |